March 31, 1970 H. W. EARLE 3,504,290
PULSE CORRECTOR
Filed Dec. 13, 1967 4 Sheets-Sheet 1

INVENTOR
H. W. EARLE
BY John P. Mc Donnell
ATTORNEY

United States Patent Office 3,504,290
Patented Mar. 31, 1970

3,504,290
PULSE CORRECTOR

Harold W. Earle, New Shrewsbury, N.J., assignor to Bell Telephone Laboratories, Incorporated, Murray Hill, N.J., a coporation of New York Filed Dec. 13, 1967, Ser. No. 690,219
Int. Cl. H03k *5/13*
U.S. Cl. 328—164 7 Claims

ABSTRACT OF THE DISCLOSURE

In a pulse corrector, a free-running output pulse generator is turned ON a predetermined time after receipt of the first pulse of an input pulse train. The number of pulses received and the number generated are counted in separate counters. When the number of pulses generated catches up with the number received, the generator is turned OFF and the counters reset in preparation for the next pulse train.

BACKGROUND OF THE INVENTION

This invention relates to the field of pulse data processing and particularly to telephone dial pulse processing.

In a pulse data processing system, each individual pulse of a pulse train must be recognized as such by every piece of equipment within the system which might act upon the information contained in the pulse train. The larger a system is, the more equipment and the greater distance a given pulse train may have to traverse. Since each piece of equipment and each length of conductor distorts each pulse in the train, relatively tight tolerances must be applied to initial pulse shape, amplitude and spacing in order to insure proper transmission throughout a large system. The telephone direct dialing system is undoubtedly the largest pulse data processing system in existence, having millions of inputs and thousands of switching centers connected by miles of conductors. If pulse trains are used which are outside of tolerances, wrong numbers will be connected when correct numbers are dialed.

In recent years, it has become desirable to couple more and more types of equipment made by more and more manufacturers to the telephone lines, for example, repertory dialers and alarm couplers. Inevitably, some of these equipments product dial pulse trains which do not meet system tolerances. While pulse shape and amplitude are easy to correct, pulse spacing is not.

It is this problem that gave rise to the pulse reconstituting dial coupler as an interface between the equipment emitting incompatible pulse trains and the telephone line. In the typical dialing coupler now used, the nonstandard pulses are reshaped and counted in a digital counter. After the entire pulse train for one digit has been received and counted, the counter counts back down, triggering an output pulse for each counted input pulse. The output pulser is designed to meet the tolerances of pulse characteristics and spacing required by the system. Since the digital counter cannot count input and output pulses at the same time, however, the initiation of output pulsing must await the pause which signals the end of input pulsing. Of course, the pulse train representing a subsequent digit cannot be received until the outpulsing of a previous train has been completed. As a consequence, an unusually long delay is required between digits from the input equipment. Such a delay not only burdens the input equipment, but ties up all of the equipment associated with the call, limiting the amount of traffic the system can handle. Furthermore, it prevents the dialing coupler from being used where such delay cannot be tolerated.

An object of this invention is, therefore, to emit pulse trains of desired characteristics in response to received pulse trains which may have defects.

Another object is to emit pulse trains containing the same number of pulses as received pulse trains with a minimum delay between successive pulse trains.

A third object is to emit pulse trains containing the same number of pulses as received pulse trains while the latter are being received.

Still another object is to provide an inexpensive effective digital pulse train corrector.

SUMMARY OF THE INVENTION

An astable output pulse generator is started after the reception of the beginning of an input pulse train. A first counter counts the number of pulses in the input train, while a second counter counts the number of pulses in the output train. When a comparator connected to both counters senses that both counts are equal, reset means stops the output pulse generator and resets the counters. The output pulse train can, therefore, contain the proper number of pulses of correct shape and spacing without delaying the input.

DETAILED DESCRIPTION

Figure 1:
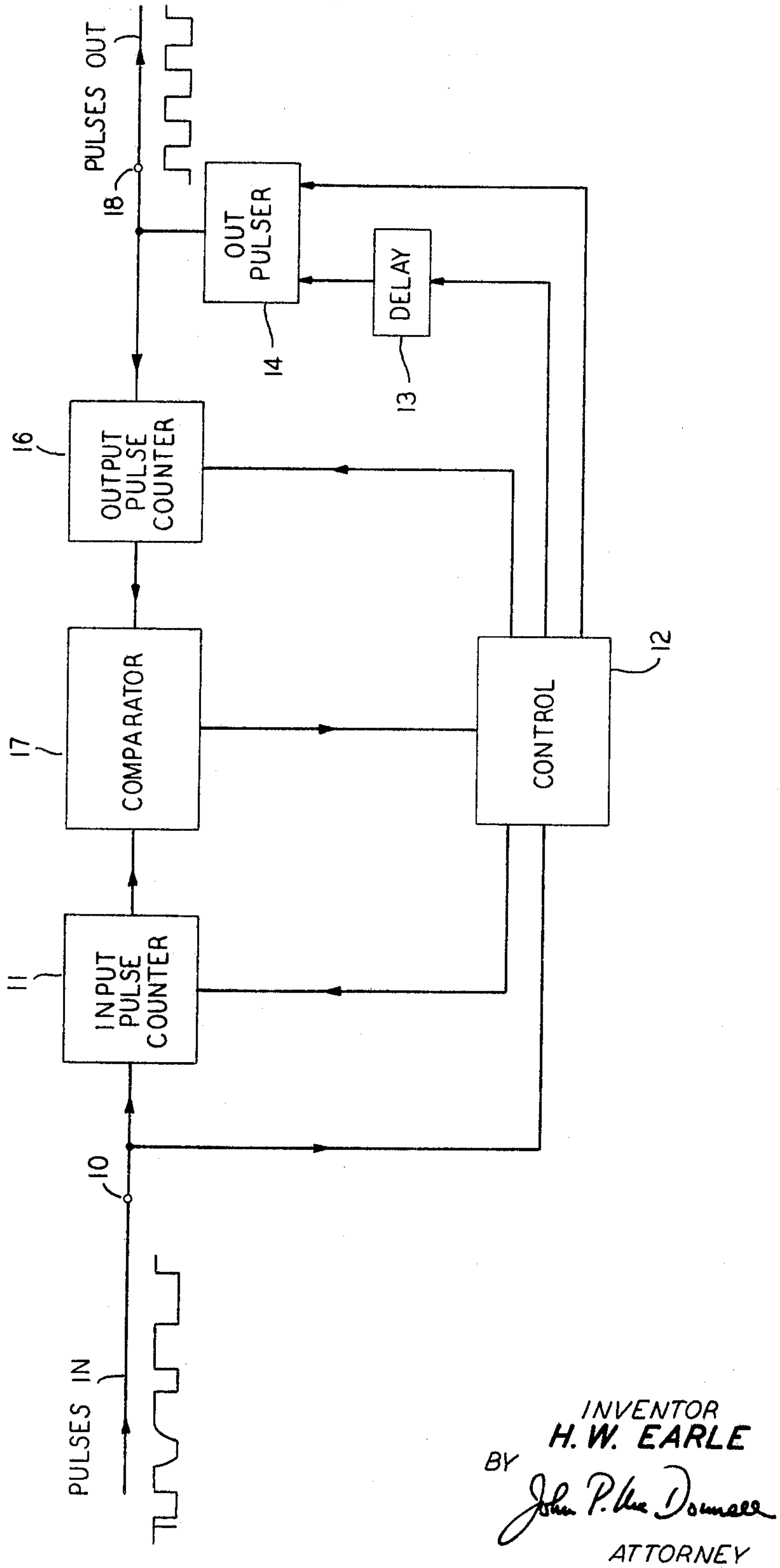
FIG. 1 is a block diagram of the invention in simple form.

In the embodiment shown in block form in FIG. 1, an input terminal 10 is connected to a first counter 11 and a control unit 12. Control unit 12 has connections to a delay timer 13, an output pulse generator 14, first counter 11, a second counter 16, and a count comparator 17. In addition, count comparator 17 is connected between both counters 11 and 16; and output pulse generator 14 is connected to delay timed 13, second counter 16, and an output terminal 18.

Distorted or nonstandard pulse trains that are to be standardized are introduced at input terminal 10 from where they are simultaneously fed to first counter 11 and control unit 12. Upon receipt of the first pulse of the input train, control unit 12 removes the reset voltage from counters 11 and 16 and starts delay timer 13 running. With reset voltage removed, counter 11 counts the number of pulses in the input train. After a predetermined delay time has expired, timer 13 enables output pulse generator 14 to start running, feeding to output terminal 18 and second counter 16 a continuous train of pulses of desired shape, spacing and duty cycle. Counter 16, of course counts these output pulses. Count comparator 17 continually compares the counts of counters 11 and 16 and when they are equal—i.e., when the number of pulses in the output train equals the total number of pulses in the input train—sends a signal to control unit 12. Control unit 12, in response to the signal from comparator 17, stops output pulse generator 14 before it can produce another pulse and resets counters 11 nad 16. An output pulse train of desired characteristics has therefore been produced having the same number of pulses as an input train of unacceptable characteristics and the circuit is quickly ready to act upon a subsequent pulse train.

In choosing components to fill the blocks of FIG. 1, the designer has relatively wide choice, limited only by the pulse trains to be handled and the obvious necessity of mutual compatability. Counters 11 and 16, for example, may be any of the well-known analog or digital counters that can reliably count the number of pulses in the particular trains to be expected. With analog counters, the pulse shape and repetition rate may be more limiting, while the digital counters total count capacity and sensitivity to noise may control. Count comparator 17 must, of course, be able to compare the counts stored in each counter. With two analog counters, comparator 17 may be a simple transistor gate biased by the difference between the analog voltages stored in the two counters. With digital counters, one of the relatively more sophisticated comparators which compare the state of each corresponding digit of the counters will be required.

Output pulse generator 14 may be, for example, an astable multivibrator, a blocking or relaxation oscillator with a pulse shaper, a thermal automobile flasher or even a motor driven cam actuated switch. Likewise, delay counter 13 may be almost any electrical timer which will turn ON output pulse generator 14 after the required delay, including monostable multivibrators, thermal relays, etc. Finally, control unit 12 can easily be supplied, for it is a simple bistable circuit whose output in one state will turn ON delay timer 13 and in the other state, will turn OFF pulse generator 14, and whose state is changed by an input pulse train or a signal from comparator 17.

The delay of timer 13 is required to prevent premature turn OFF of the output pulse train and is only necessary when the input pulse train might be longer in time duration than the output pulse train. The amount of time delay required is, therefore, the difference between the maximum anticipated input pulse train duration and the minimum output pulse train duration of the same number of pulses.

Figure 2:
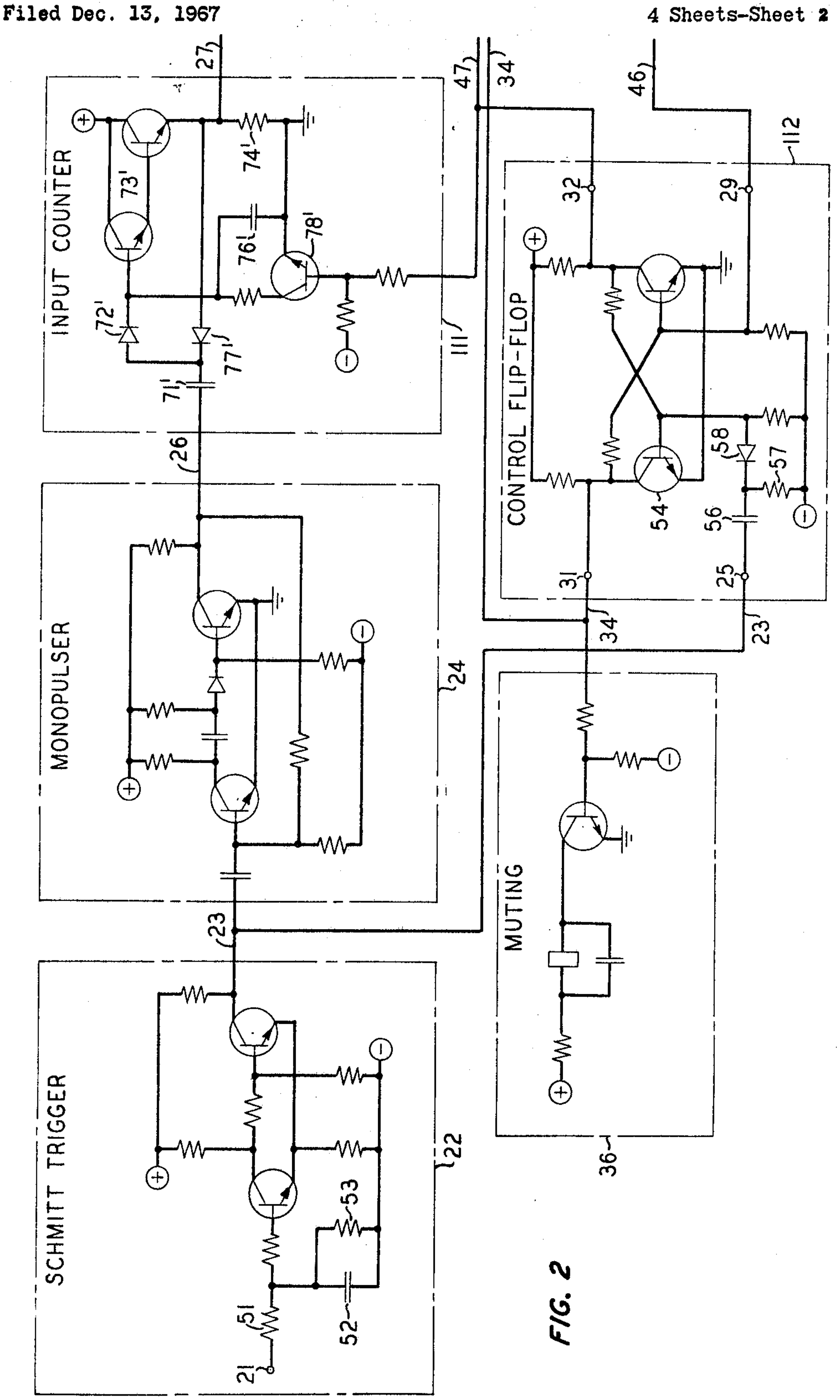
FIGS. 2 and 3, taken together, are a schematic circuit diagram of a useful embodiment.
Figure 3:
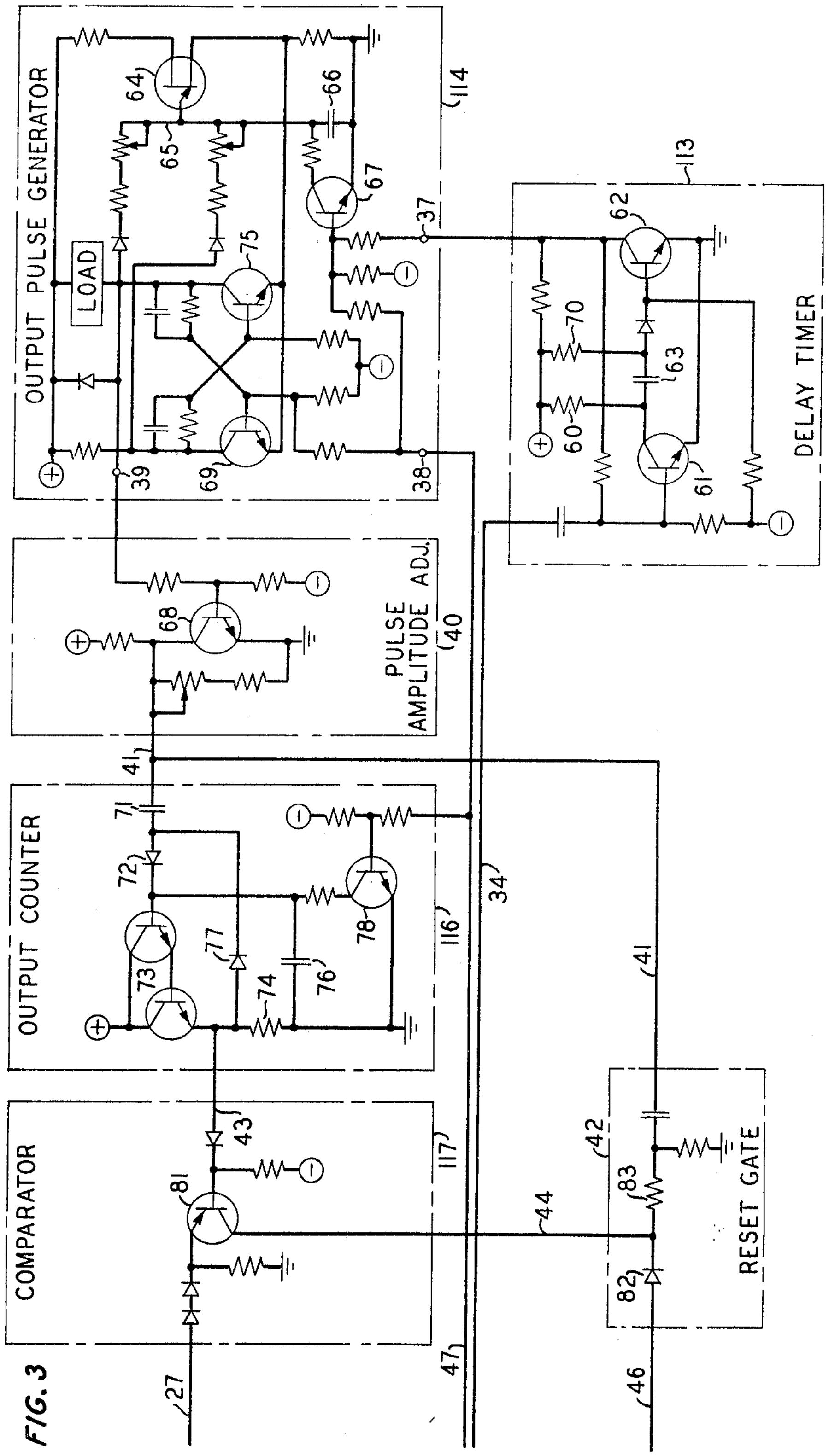
Figure 4:
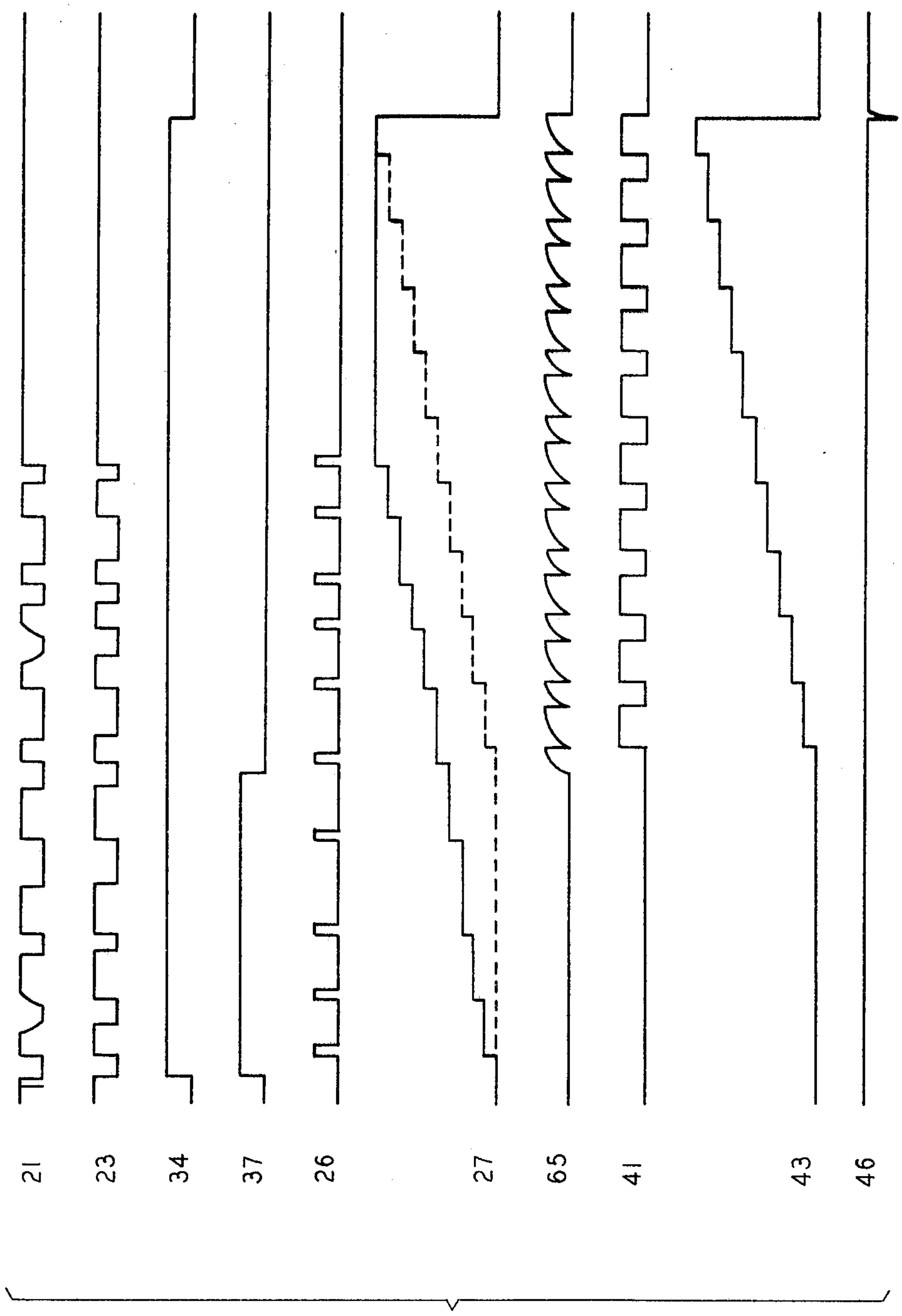
FIG. 4 is a time plot of waveforms from various points in the circuit of FIGS. 2 and 3.

One of the many possible embodiments that might be used to implement the block diagram of FIG. 1, is the telephone dial pulse corrector schematically shown in FIGS. 2 and 3. The two figures make up one schematic drawing, conductors 27, 47, 34 and 46 at the right side of FIG. 2 continuing on to the left side of FIG. 3. To the block diagram of FIG. 1 input pulse shaping and receiver muting apparatus has been added. As shown in FIG. 4 of the drawing, a pulse train to be corrected is connected to the input 21 of a Schmitt trigger 22. The output of the Schmitt trigger is connected by a conductor 23 to the input of a monopulser 24 and to one input 25 of a bistable control flip-flop 112. The output of monopulser 24 is connected via a conductor 26 to the input of an analog staircase counter 111, the output of which is connected via a conductor 27 to one input of a comparator circuit 117. Control flip-flop 112 has two inputs, 25 and 29, and two outputs, 31 and 32. Output 31 is connected via conductor 34 to the inputs of a receiver muting circuit 36 and a delay timer 113, respectively. A free-running output pulse generator 114 has two inhibit inputs 37 and 38, and one output, 39. The output of delay timer 113 is connected to inhibit input 37. Pulse generator output 39 is connected to the input of a pulse amplitude adjuster 40 of which the output is connected via a conductor 41 to the inputs of an output pulse counter 116 and a reset gate 42. The output of pulse counter 116 is connected via a conductor 43 to the other input of comparator 117, the output of which is connected via a conductor 44 to the inhibit input of reset gate 42. The output of reset gate 42 is connected by a conductor 46 to input 29 of control flip-flop 112. Finally, output 32 of control flip-flop 112 is connected via a conductor 47 to reset inputs of counters 111 and 116 and to inhibit input 38 of output pulse generator 114.

In order to make the operation of the circuit clear, the voltage waveforms between several points in the circuit and ground have been plotted against a common time abscissa in FIG. 4, each wave form being labeled with a number corresponding to the circuit element at which it is taken. Waveform 21, therefore, corresponds to the voltage waveform at the input of the Schmitt trigger 22, i.e., the dial pulse train to be corrected by the circuit embodying the present invention. For the purpose of illustration, several types of pulse train defects have been included in waveform 21, even though such a combination would be improbable.

The Schmitt trigger eliminates the effect of contact bounce on the input pulse train and is aided in so doing by an integrating network in its input circuit comprising a series resistor 51, a shunt capacitor 52 and a shunt resistor 53. With this network, instead of following the input waveform as is usual for Schmitt triggers, the leading edge of the waveform at the output is delayed long enough to overcome any contact bounce that disturbs the input waveform. This can readily be seen by comparing waveform 23 with waveform 21.

Monopulser 24 is useful to insure accurate counting of the input pulses by counter 111 by producing pulses of uniform amplitude and duration. It is a common two transistor monostable multivibrator with a capacitor coupled input. As shown by output waveform 26, it produces a positive output pulse for each positive going trailing edge of the Schmitt trigger pulses of waveform 23.

Control flip-flop 112 is a two transistor bistable multivibrator of common variety, with an input to each transistor base and an output from each collector. Its state is changed by biasing off the conducting transistor. In between pulse trains, transistor 54, whose collector is connected to output 31, is conducting. A differentiating circuit comprising a series capacitor 56, a shunt resistor 57 and a series diode 58 is connected between input 25 and the base of transistor 54. The diode is poled to pass negative input pulses; it therefore passes the leading edge of the first pulse of a digit train from the Schmitt trigger waveform 23. Control 112, thereupon, changes its state, removing positive voltage from output conductor 47 and placing positive voltage on output conductor 34, which initiates the timing cycle of delay timer 113 as discussed hereinafter.

Muting circuit 36 is useful to prevent the dial pulses from appearing in the telephone receiver during dial pulsing. It may be as shown, a simple relay circuit with a relay winding in a transistor collector circuit. The base of the transistor is driven by the waveform on conductor 34. Normally open relay contacts are closed by operation of the relay to short out the telephone receiver as long as there is a positive voltage on conductor 34.

Delay timer 113, which turns ON output pulse generator 114 a predetermined time after the first pulse appears at input 21, is a simple astable multivibrator, similar to monopulser 24. It comprises basically, an input transistor 61, an output transistor 62 and a timing capacitor 63. Each terminal of capacitor 63 is connected to the positive voltage source through a resistor 60 and 70, respectively. In the quiescent position between pulse trains, output transistor 62 is conducting, and timing capacitor 63 charges up with its terminal that is connected to the collector of transistor 61 positive. When conductor 34 goes positive, transistor 61 is turned ON, immediately turning OFF transistor 62 and applying a positive voltage to inhibitor input 37 of output pulse generator 114. When capacitor 63 has charged in the opposite direction through resistor 70, transistor 62 turns back ON, turning OFF transistor 61 and grounding inhibitor input 37. The delay time is set, of course, by the time constant of capacitor 63 in series with resistor 70.

Output pulse generator 114 which provides pulses of proper shape, amplitude, and spacing to the load, may conveniently be a bistable multivibrator similar to control flip-flop 112 and comprising an initially conducting transistor 69 and an initially nonconducting transistor 75. In order to provide free-running operation, the bistable multivibrator may be driven by a unijunction transistor relaxation oscillator. The relaxation oscillator comprises a unijunction transistor 64 with a timing capacitor 66 in the circuit of its emitter 65. In order to allow adjustment of pulse repetition rate and duty cycle, timing capacitor 66 is provided with two separate charging paths. One path is connected to the collector of each transistor, 69 and 75, for its source voltage, and each path includes a diode and a variable resistance. The diodes operate to make each path independent, the one connected to the nonconducting transistor being, in each case, the operative path. When the capacitor voltage, hence the unijunction emitter-base voltage, exceeds a fixed percentage of base to base voltage, the unijunction transistor conducts, discharging the capacitor and applying a positive pulse to the emitters of transistors 69 and 75. The bistable circuit thereupon changes state, and capacitor 66 changes its charging path. The relaxation oscillator, therefore, alternates charging paths for each cycle. When an output pulse train of other than 50% duty cycle is desired, the two charging time constants are adjusted to different values. The duration of the relaxation oscillator cycle thereupon alternates, as illustrated by emitter waveform 65 of FIG. 4. When the voltage at either inhibitor input 37 or 38 is positive, a transistor 67, whose collector-emitter path shunts timing capacitor 66, is turned ON, precluding the charging of that capacitor and hence the operation of the relaxation oscillator. The winding of an output relay may be used as the load resistor of transistor 75, with contact closures or openings of the relay providing the desired corrected pulse output signal.

Pulse amplitude adjuster 40, which is used to make the amplitude of pulses into output counter 116 equal to that of pulses into input counter 111, may be a simple adjustable voltage divider, the output portion of which is shunted by the collector-emitter path of a transistor 68. The base of transistor 68 is driven by pulses from output pulse generator 114. Since positive going pulses are desired from pulse amplitude adjuster 40, and this arrangement reverses the phase of pulses fed into the base of transistor 68, input pulses are taken from the collector of transistor 75. Pulses from the collector of transistor 69, of course, would be of opposite phase.

Analog counters 111 and 116, which count the number of pulses that appear on conductors 26 and 41, respectively, are identical staircase registers that store an analog voltage step for each pulse received. For simplicity, therefore, the output counter will be described; the elements of the input counter have the same identifying numbers, primed. Positive pulses are coupled through a capacitor 71 and a diode 72 to the base input of a Darlington transistor pair 73. The output of the Darlington pair is connected between a positive voltage source and a grounded resistor 74. A storage capacitor 76 is connected between the cathode of diode 72 and ground, and an oppositely poled diode 77 connects the anode of diode 72 and the emitter of Darlington pair 73. A positive input pulse charges capacitors 71 and 76 in series through diode 72. The voltage across capacitor 76 turns ON the Darlington pair, developing a voltage across resistor 74 which is slightly less than the charge on capacitor 76. Capacitor 71 then discharges and charges in the opposite direction through diode 77. The input pulse duration is several times the time constant of the charging circuit, so that steady state is reached for each pulse, and capacitor 76 increases its potential a uniform amount for each pulse. The output voltage is taken across resistor 74, and therefore is equal to the voltage stored in capacitor 76 minus the drop across the Darlington pair, or approximately one volt less than the stored voltage. The collector-emitter path of a transistor 78 shunts storage capacitor 76 in order to discharge it at the end of each pulse train.

Comparator 117, which compares the voltages stored in the two analog counters, and hence the number of pulses counted, may conveniently be a simple germanium pnp transistor 81 with one analog voltage fed to its emitter, the other to its base, through separate diodes. In this particular circuit, the emitter is fed from input counter 111 through two diodes, while the base is fed from counter 116 through one diode. This insures a larger voltage drop in the emitter circuit, providing positive turn OFF when the input and output voltages are equal. Obviously, the voltage steps of the two counters must be greater than the voltage drop across one conducting diode. During the time that the number of pulses counted by input counter 111 is greater than that counted by output counter 116, therefore, emitter voltage exceeds base voltage, and transistor 81 is conductive. As soon as the number of pulses counted by counter 116 catches up to that counted by 111, however, base voltage exceeds emitter voltage, and transistor 81 is turned OFF.

Reset gate 42 is used to change the state of control flip-flop 112 when transistor 81 is turned OFF and the last pulse of the output train is completed. It may be a diode 82, poled to pass negative pulses to the gate output, connected through a resistor 83 to a differentiating network at the gate input. When transistor 81 of comparator 117 is conducting, the voltage developed across resistor 83 back biases diode 82. When the transistor is shut OFF, the back bias is removed and any negative going impulse that appears at the reset gate input passes through this gate. When the output pulse from generator 114 that represents in number the final pulse of the input pulse train appears on conductor 41, it is added to the voltage stored in output counter 116; comparator 117 turns OFF, opening gate 42. The trailing edge of that output pulse passes through the differentiating circuit and diode 82 to input 29 of control flip-flop 112. Control 112 thereby changes state, removing positive voltage from conductor 34 and placing a positive voltage on conductor 47. The positive voltage on conductor 47 turns ON transistors 78 and 78′ to discharge capacitors 76 and 76′, respectively, and transistor 67 to discharge capacitor 66, thereby preventing further oscillation of the output pulse generator and resetting the counters. It also insures that initially ON transistor 69 of the bistable circuit in the output pulse generator remains ON by applying the positive voltage to its base.

The circuit, therefore, produces an output pulse train of adjustable pulse repetition rate and duty cycle, having the same number of pulses as an input pulse train, with minimum delay between digits, from simple low cost circuitry.

What is claimed is:

1. Pulse reconstituting apparatus for emitting in response to an input pulse train, an output pulse train having an equal number of pulses camprising an astable output pulse generator, input pulse counting means for counting the number of pulses in said input pulse train, output pulse counting means connected to the output of said output pulse generator for counting the number of pulses in said output pulse train, comparator means connected to the outputs of said input and output pulse counting means for sensing the condition when the number of pulses counted by said input and output pulse counting means are equal, and control means connected to the input of said input pulse counting means, the output of said comparator means and the input of said output pulse generator for starting said output pulse generator after the beginning of said input pulse train and stopping said output pulse generator when said condition of equal pulse counts is sensed.

2. Pulse reconstituting apparatus as in claim 1 wherein said input and output pulse counting means store a uniform voltage step for each pulse counted, and said comparator means compares the stored voltages.

3. Pulse reconstituting apparatus as in claim 1 wherein said control means includes delay means for starting said output pulse generator a predetermined time after the beginning of said input pulse train.

4. Pulse reconstituting apparatus as in claim 1 wherein said control means includes reset means connected to said input and output pulse counters for resetting said input and output pulse counters when said output pulse generator is stopped.

5. Pulse reconstituting apparatus as in claim 1 wherein said control means includes a gate circuit connected to the input of said output pulse counting means and to the output of said comparator means for changing the state of said control means at the termination o fthe last pulse in said output pulse train.

6. Pulse reconstituting apparatus as in claim 2 including pulse shaping means connected to the input of said input pulse counter for providing uniform pulses to said input pulse counter and pulse amplitude adjusting means connected between said output pulse generator and said output pulse counter for equalizing the voltage steps stored in said input and output pulse counters.

7. Pulse reconstituting apparatus as in claim 6 including telephone receiver muting means connected to said control means for muting telephone receivers whenever input or output pulses are present.

References Cited

UNITED STATES PATENTS

| | | | |
|---|---|---|---|
| 2,540,167 | 2/1951 | Houghton | 331—20 |
| 2,891,157 | 6/1959 | Honsel | 331—18 X |
| 3,218,532 | 11/1965 | Toscoro | 307—220 X |
| 3,287,655 | 11/1966 | Venn et al. | 307—220 |

JOHN S. HEYMAN, Primary Examiner

R. C. WOODBRIDGE, Assistant Examiner

U.S. Cl. X.R.

179—85; 235—92; 307—220, 260; 328—41, 48; 331—18 340—168